Oct. 22, 1968  E. W. ALMQUIST, JR  3,406,957
SPRING CONTROL MEANS FOR REAR
DRIVEN AUTOMOBILE AXLES
Filed May 26, 1966  2 Sheets-Sheet 1
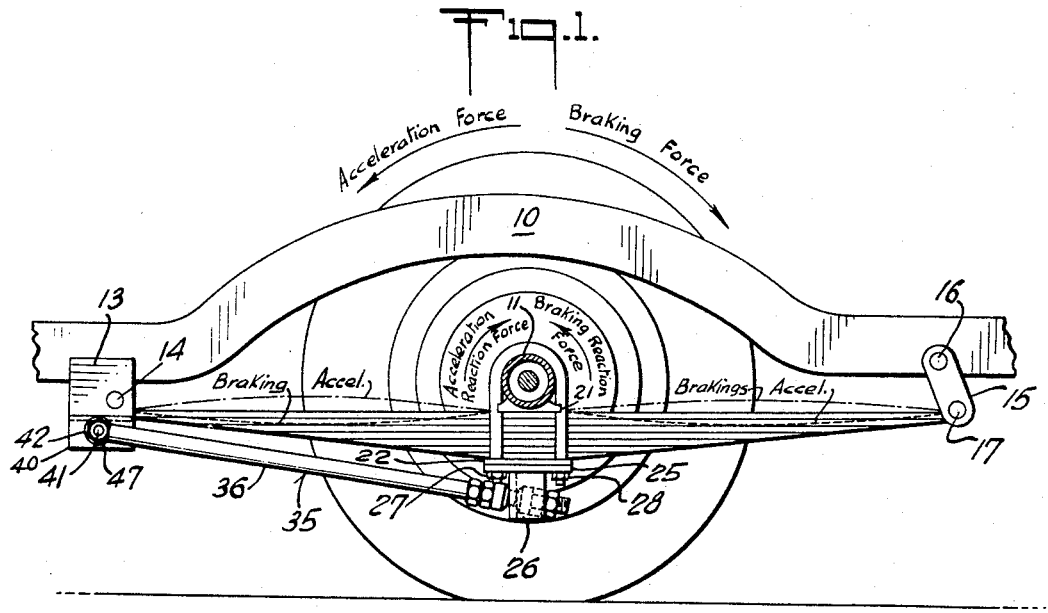
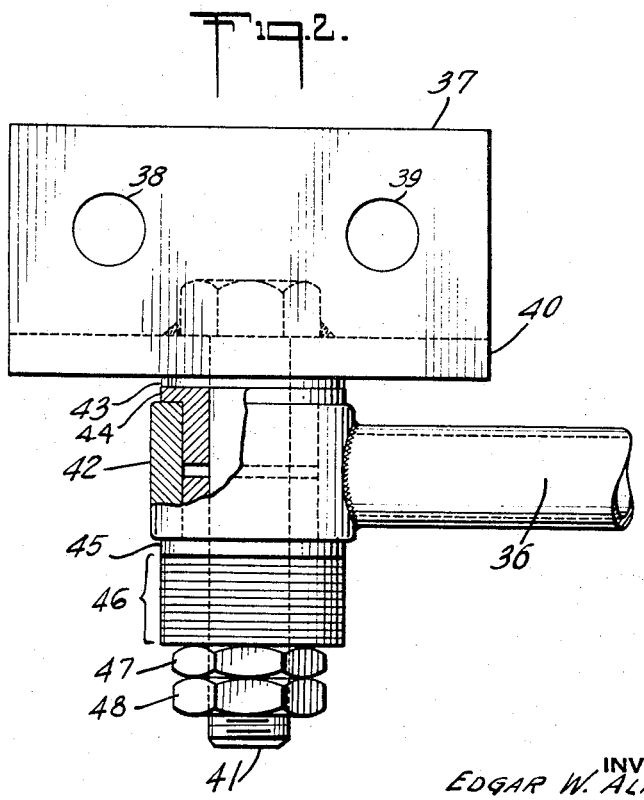
INVENTOR:
EDGAR W. ALMQUIST JR
BY
Morrison Kennedy & Campbell
ATTORNEYS.

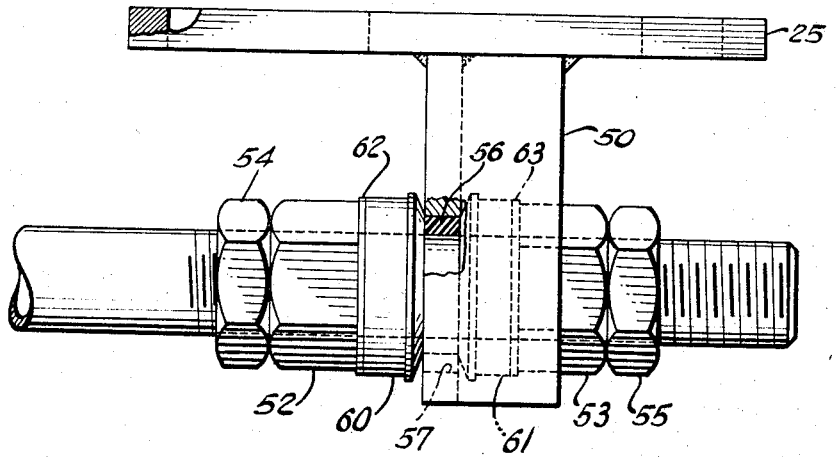
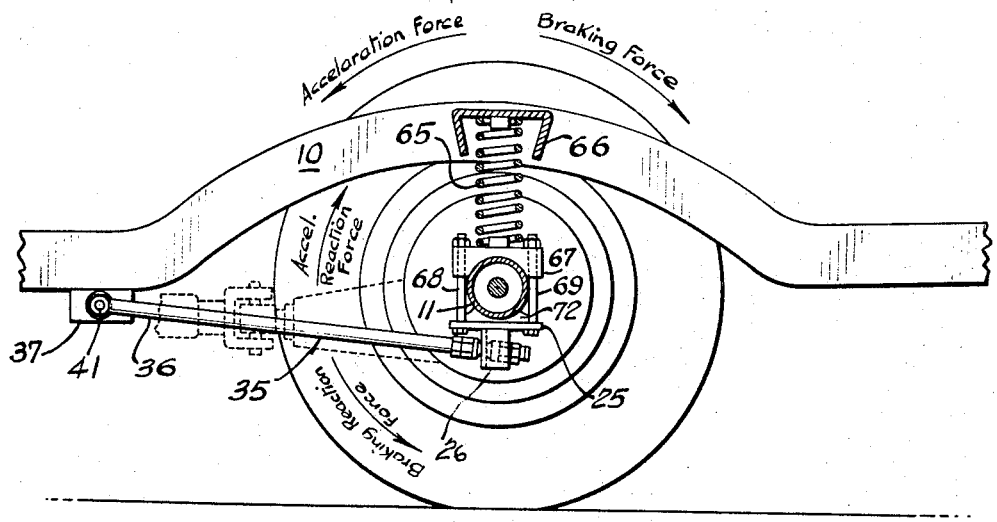

United States Patent Office 3,406,957
Patented Oct. 22, 1968

1

3,406,957
SPRING CONTROL MEANS FOR REAR DRIVEN
AUTOMOBILE AXLES
Edgar W. Almquist, Jr., Milford, Pa., assignor to Sparkomatic Corporation, Milford, Pa., a corporation of Pennsylvania
Filed May 26, 1966, Ser. No. 553,133
7 Claims. (Cl. 267—67)

This invention relates to means for controlling the spring action of both coil and leaf springs used on rear driven automobiles during acceleration and braking periods to thereby control the traction of the wheels with the ground.

The rear wheels are driven by shafts journaled in the rear axle housing which contains the two shafts on the outer ends with the differential housing forming the center portion and having the springs either coil or leaf mounted and anchored thereto. The result is that when a sudden accelerating rotation is imparted to the drive shaft, to cause the drive wheels to be turned rapidly in a forward direction, there is an equal and opposite reactive force built up in the axle. This reactive force tends to displace the springs, whether coil or leaf, and the wheels to tend to lift off the ground and lose traction. In some instances, when the parts become worn, there will result a chattering or shuddering of the entire rear drive structure which in turn will be transmitted to the chassis.

The main object of the present invention is to control and eliminate the reactive forces that tend to displace the springs during acceleration and braking and allow the right and left rear wheels to have equal traction on the ground, provided the tires are the same and inflated to the same pressures. In other words, the object is to provide a rear end drive wherein the forces in the operating mechanism are equalized to prevent "road hop" and thus allow even positive acceleration and stopping with no skidding.

Another object of the invention is to provide a resilient connection between the chassis and the axle on both sides of the automobile, which connection is so constructed as to allow the forces that are to be developed and applied at both the anchored end and the axle or movable end to be completely and individually controlled to resist the torque developed in the rear axle during both the accelerating and braking periods. In addition, the resilient connection will operate continuously to help control the axle during normal driving periods wherein extreme axle and spring movements necessitate axle stability for smooth riding.

Still another object of the invention is to provide between the chassis and the axle on both sides of the automobile a resilient connection which is so constructed as to be individually adjustable at both the anchored end and the axle or movable end to thus allow individual control for both acceleration and braking of each wheel and in addition allow the application of different forces in either direction to compensate for the rotative force set up in the axle itself.

A still further object of the invention is to provide a resilient connection for rear driven automobiles which is designed for ease and economy of manufacture as well as ease of installation and adjustment.

And a still further object of the invention is to provide a practical, reliable and durable resilient connection for the wheels of rear driven automobiles which is exceedingly effective and may be readily varied to fit all types of cars with a minimum of changes. Moreover, the resilient connection of the instant invention may be used on cars supplied with the normal radius bars which are usually anchored to the top of the axle to provide further axle and spring control.

2

Still further objects and features of the invention will hereinafter appear from the folowing specification and drawings.

In the drawings:
FIG. 1 is a side elevation of a back wheel of a rear axle driven automobile showing the rear end housing, axle, leaf springs, and the resilient connection between the chassis and the axle housing;
FIG. 2 is a top elevation of the rotatable mounting fastened on the chassis and arranged on one end of the resilient connection;
FIG. 3 is a side elevation of the slidable and resilient mounting fastened on the axle housing and arranged on the other end of the resilient connection; and
FIG. 4 is a side elevation of a back wheel of a rear axle driven automobile showing the rear end housing, axle, coil springs, and the resilient connection between the chassis and the axle housing.

Referring now to FIGS. 1, 2 and 3, the frame of the automobile 10 has the rear axle housing 11 connected thereto by means of the leaf spring 12 secured at its front end in the stationary bracket 13 by means of the pin 14 and at its rear end in the movable shackle 15 by means of the two pins 16 and 17. The leaf spring 12 is clamped to the axle housing 11 at its center by means of two U bolts 19 and 20 arranged over the axle housing 11 through the spring pad 21, then through the horizontal bottom plate 22, then through the plate 25 of the resilient mounting 26, and the nuts 27, 28, 29 and 30 on the ends of the U bolts 19 and 20 are tightened up against the bottom plate. It will be noted that the spring pad 21 and the botom plate 22 form perfectly flat and parallel surfaces for retaining the spring 12 in place on the axle housing 11.

The resilient connection 35 comprises a suitable steel tube 36 arranged in a sloping position when the car is standing still in an unloaded state, the front end of the tube, as shown in FIG. 2, being rotatably mounted on the chassis below the fixed shackle 13 either by means of bolts or welding. The bracket consists of a length of angle 37 arranged with two holes 38 and 39 whereby the angle may be mounted by bolting therethrough or welding as deemed expedient, while the downwardly depending leg 40 of the angle 37 is formed with a bolt 41 placed in a suitable hole drilled therein and welded thereto. The steel tube 36 is formed with a cylindrical steel bushing 42 welded thereto to create the anchoring means for the resilient connection 35. In mounting the anchored end 42 on the bolt 41, there is first placed a flat steel washer 43 against the angle, then two collared bushings 44 and 45 of oilite bronze, brass or nylon are placed in the bushing 42, then a suitable plurality of flat steel washers 46 are placed thereon and two jam nuts 47 and 48 are turned into place and locked. This arrangement is so designed as to give a definite anchorage point but allow a turning movement with a built-in restraining means adjustable by means of the jam nuts 47 and 48 to give further control to the axle movement in a rotary direction through the long arm of the resilient connection to help control the spring movement. Where greater control is deemed necessary, the diameter of the washers may be further increased and suitable plastic washers interposed between the steel or brass washers to result in greater frictional resistance being built up therein. The two bushings 44 and 45 are normally made of nylon or rubber of suitable durometer rating to have a memory and resist permanent displacement or of oilite bronze, and here again the outwardly extending portions thereof may be increased in diameter to match the diameters of the washers in order to cooperate therewith.

The rear end resilient mounting 26 shown in FIG. 3 is slidably and resiliently mounted for endwise movement on the rear axle housing 11 and consists of the plate 25 which is bolted onto the bottom of the spring by means of the U bolts 19 and 20 and fitted with a downwardly depending length of channel 50 containing a hole 51 in the back portion thereof. The steel tube portion 36 of the resilient connection 35 is fitted in the hole 51 and the end portion is threaded for a suitable distance to provide adjustment distance for a series of adjusting nuts 52 and 53 and jam nuts 54 and 55, one set placed ahead of the hole 51 and the other set on the other side to thus provide means for varying the resistance to the torque applied to the axle 11. In addition, the hole 51 is fitted with a suitable nylon bushing 56 which will provide a means for protecting the thread on the tube portion 36 when said tube is moved therethrough during normal operation. Furthermore, the bushing will tend to quiet the operation of the tube and prevent the transmission of noises into the spring and axle during movement. The restraining or torquer resisting means consists of two thick washers 60 and 61 made of suitable displaceable materials such as rubber or plastic having memories such that they will return to their original form after displacement under force. Abutting the sides of the two washers 60 and 61 are two Belleville washers 62 and 63 which will tend to contain said washers during displacement and also hold the nylon bushing 51 in place during movement and two flat washers 62 and 63 will allow the turning of the adjustment nuts 52 and 53 to take place without effecting the washers 60 and 61. In light cars, it is possible to use two or more Belleville washers and so contain the thick washers therebetween even though they may be made of a softer material. In heavier cars, where the forces are greater, it is possible to use tapered springs so designed as to supply very light restraining forces at the beginning but build up the restraining force very rapidly as displacement takes place. The springs may furnish a straight line resistance or variable resistance building up as displacement takes place predicated on the amount of movement to be controlled. Once the adjusting nuts 52 and 53 are suitably placed, the jam nuts 54 and 55 are locked in place and will keep the adjustment until the washers or springs change and lose their resilience due to the material fatiguing under continuous load.

In normal accelerating operation, the drive shaft will turn and produce forward rotary motion in the drive shaft contained in the axle and differential housing 11 to cause the wheel and tire to rotate in a counterclockwise direction, looking at FIG. 1, and this counterclockwise applied torque to turn the wheel produces an oppositely directed torque equal to the applied torque, causing the axle housing 11 to tend to rotate in a clockwise direction to cause the spring to flex upwardly forward of the axle and downwardly aft of the axle and in so doing cause the axle with the wheels mounted thereon to lift upward and forward to cause the wheels to lose traction. Actually what is happening is that the entire rear end assembly is lifted free of the ground, using the mass of the body and frame as the anchoring or fulcrum point to cause the rear wheels to spin free and lose their traction momentarily. But the momentary spinning free, if the road conditions are right can continue for a short time and cause trouble by producing skidding.

In normal braking operaions, the brake shoes being mounted on a back plate contained on the axle housing 11 cause the housing to rotate in a counterclockwise movement and causes the spring to flex downwardly forward of the axle and upwardly aft of the axle and push the body and chassis upward and forward and carry the axle and wheels therewith to cause a loss of traction. In so doing, it is possible to cause a skid on one or both of the wheels as the wheels become locked when they lose their traction and there is no resistance. Then, when the wheels return to the road in locked position, one or both may stay locked depending on the road conditions to thus cause the wheels to stay locked and the car go into a skid with one or both wheels locked.

In view of these facts, it will now be understood that the resilient connection 35, rotatably mounted at one end on the chassis and resilient mounted at the other end for endwise movement on the rear axle housing, can control the spring action to result in better traction characteristics. The fact that the connection is mounted below the spring lessens the amount of reactive force needed, as it is applied through the lever arm about the center of the axle housing. In addition, the braking action of the forward rotatable mounting which is also arranged to furnish a restraining force tends to help to control spring action. The adjustment means furnished at the sliding and resilient mounting under the spring can be adjusted to take up practically any type of force simply and without any problems, as the resilient washers or springs 60 and 61 may be made of practically any size and length necessary to give proper reactive forces and so control the spring action separately during acceleration and braking. The other feature is the individual adjustments that are possible on each wheel wherein the acceleration may be controlled by one force and the braking by another force without interfering one with the other.

There is still another force existent in the rear end which may also be controlled by the resilient connection 35 and that is the rotative force generated in the axle itself as the drive shaft turns and in turn causes a rotative movement to be set up in the rear axle assembly. The rotative force tends to lift one side and drive the other side down and it is this rotative movement that the anchored end adjustment can control as it is a smaller and more easily controlled force. The resilient connection 35 may be preloaded sufficiently to prevent the wheel which has the tendency to lift from being displaced so that both wheels are loaded equally for equal traction and power delivery. In addition it must be remembered that in this instance the springs themselves help to control this force.

Referring now to FIG. 4, the frame of the automobile 10 has the rear axle housing 11 connected thereto by means of coil spring 65 anchored at the chassis end by spring pad 66 and on the axle by spring pad 67 bolted to the axle housing 11 by means of bolts 68, 69, 70 and 71 (70 and 71 not shown), using axle pad 72 below the axle for placement. In this figure, the gear housing and drive shaft are shown dotted in order to more fully show how slight rotative movements of the axle during acceleration and braking will move the drive end up and down and cause further whip.

The resilient connection 35 shown in this figure is the same as shown in FIGS. 1, 2 and 3 and therefore in the interest of brevity further description thereof will be dispensed with. The actual action of the rear end under accelerating and braking forces is slightly different and more pronounced due to the use of the coil springs. Upon the application of power to produce acceleration, the rear end as a unit tries to rotate upwardly around the axle contained in the housing 11. The wheels therefore also try to travel forward and upward, causing the springs to flex in an arc as the entire rear end assembly tries to move ahead of the chassis and body and in so doing causes the wheels to spin free and lose traction. The drive shaft and drive also rotate upwards to displace the universal and cause noises therein due to the angularity thereof and the attempt to put power therethrough. The reverse of this takes place when braking is effected to cause the entire rear end assembly to rotate in a counterclockwise direction to cause the body to be lifted upwardly and forwardly and pull the axle up with it to cause traction to be lost.

Modern cars, whether small, medium or large, are equipped with high horsepower engines capable of very rapid acceleration, so that it is evident that some method of controlling the rear axle is necessary not only for rapid acceleration but also as a safety measure to help prevent skids and avoid accidents, and this is even more pronounced in braking as skidding here can mean multiple car smashups with damages to the cars and also possible loss of life or permanent injuries. In some instances, the manufacturer supplies a radius rod or its equivalent but they are permanently anchored with no adjusting means which makes them practically useless on controlling or equalizing the rear end forces. It is therefore evident that the instant invention furnishes a definite means that is continuously adjustable to control the reactive forces that are set up in the rear axle during acceleration and braking.

It will be understood that, instead of being located forward of the axle as shown in the drawings, the resilient connection may be located rearward of said axle and function in the same manner.

What is claimed is:

1. In or for a rear axle driven automobile equipped with a spring suspension system, a device for controlling the spring action during acceleration and braking periods to result in better traction characteristics, said device comprising a rigid rod rotatably mounted at one end on the chassis and said rotatable mounting including rotative resilient restraining means to resist the rotation of the rod, and said rod being slidably and resiliently mounted at the other end for endwise movement in a support depending from the lower side of the spring.

2. A device according to claim 1, wherein said rotatable mounting for the rod includes a pivot stud attached to the chassis and equipped with a pair of molded plastic bushings to form a bearing for the rod.

3. A device according to claim 2, wherein said pivot stud is also equipped at its free end with a series of flat washers and a pair of pressure adjusting and confining nuts.

4. A device according to claim 1, wherein the support depending from the lower side of the spring has a guide bore therein lined with a plastic bushing.

5. A device according to claim 4, wherein the rod is continuously threaded for a distance starting in advance of and ending beyond the bore of the bracket, said rod being equipped on both sides of the bracket with adjustable resilient torque resisting means.

6. A device according to claim 5, wherein the adjustable resilient torsion resisting means are in the form of plastic washers held in place by a pair of adjusting and locking nuts screwed onto the threaded portions of the rod.

7. In or for a rear axle driven automobile equipped with a spring suspension system, a device for controlling the spring action during acceleration and braking periods to result in better traction characteristics, said device comprising a long rigid rod member resiliently and rotatably mounted on a bracket secured to the chassis ahead of the rear axle housing, a downwardly extending bracket mounted below the spring and axle and retained thereon by means of downwardly extending bolts used to hold the spring and axle assembly, said downwardly extending bracket containing an opening lined with a suitable bushing to guide and contain the end of the rod therein, said rod being threaded and arranged in the bushing of the downwardly extending bracket, said threaded portion of the rod containing suitable adjustable longitudinal motion restraining means thereon at both sides of the downwardly extending bracket.

References Cited

UNITED STATES PATENTS

| | | | |
|---|---|---|---|
| 2,868,538 | 1/1959 | Schow | 267—67 |
| 3,321,040 | 1/1966 | Blanchette | 267—67 |
| 3,294,415 | 12/1966 | Allison | 267—67 |

ARTHUR L. LA POINT, *Primary Examiner.*

R. M. WOHLFARTH, *Assistant Examiner.*